United States Patent
Henry et al.

(10) Patent No.: US 12,271,871 B2
(45) Date of Patent: Apr. 8, 2025

(54) WIRE TRANSACTION MONITORING AND STATUS NOTIFICATION

(71) Applicant: Truist Bank, Charlotte, NC (US)

(72) Inventors: Kendra Henry, Charlotte, NC (US); Luana Peterman, Lancaster, SC (US)

(73) Assignee: Truist Bank, Charlotte, NC (US)

( * ) Notice: Subject to any disclaimer, the term of this patent is extended or adjusted under 35 U.S.C. 154(b) by 11 days.

(21) Appl. No.: 18/331,281

(22) Filed: Jun. 8, 2023

(65) Prior Publication Data
US 2024/0412179 A1    Dec. 12, 2024

(51) Int. Cl.
*G06Q 20/10*      (2012.01)
(52) U.S. Cl.
CPC .................................... *G06Q 20/10* (2013.01)
(58) Field of Classification Search
CPC ........................................................ G06Q 20/10
See application file for complete search history.

(56) References Cited

U.S. PATENT DOCUMENTS

| | | | | |
|---|---|---|---|---|
| 10,937,097 | B1 * | 3/2021 | Cruttenden | G06Q 20/405 |
| 2009/0037332 | A1 * | 2/2009 | Cheung | G06Q 20/10 |
| | | | | 705/42 |
| 2021/0182850 | A1 * | 6/2021 | Morse | G06Q 20/385 |
| 2022/0188924 | A1 * | 6/2022 | Smith | G06Q 20/223 |
| 2023/0060462 | A1 * | 3/2023 | Subramanian | G06Q 20/42 |

* cited by examiner

*Primary Examiner* — Scott C Anderson
(74) *Attorney, Agent, or Firm* — Kilpatrick Townsend & Stockton LLP; Michael A. Springs, Esq.

(57) ABSTRACT

A system for automatically monitoring wire transactions during processing by a wire transaction processing system, and actively reporting a real-time status of wire transactions that are not completed within an expected amount of time. Proactively reporting the status of a given wire transaction may be accomplished in a variety of ways and eliminates the need for an interested party to make repeated status inquiries of the wire transaction processing system or an entity associated with the wire transaction processing system, which saves time, as well as processor and memory resources, and may also help to minimize any negative consequences of a wire transaction that is slow or unlikely to complete.

20 Claims, 4 Drawing Sheets

WIRE TRANSACTION MONITORING AND STATUS NOTIFICATION

TECHNICAL FIELD

The present disclosure relates generally to wire transaction systems, and more particularly, although not exclusively, to determining the real-time status of wire transactions using reduced memory and processor resources.

BACKGROUND

An electronic transaction, such as a wire transaction, can be made between persons, between entities, or between some combination thereof. A wire transaction can include one or more communications (i.e., messages) that provide various information about the wire transaction, such as for example, identifying information about the initiating and receiving party, account information, etc. Processing a wire transaction may also require additional information gathering, as well as various other identification, authorization, or validation operations. As a result, wire transactions may occasionally not complete as quickly as expected, or at all, which can be quite problematic to the parties to the transaction. Unfortunately, wire transaction processing delays and failures are not typically proactively reported, but rather must be learned through deliberate and often repeated status inquiries. This is inefficient, and can consume significant user, processor, and memory resources.

SUMMARY

According to one example of the present disclosure, a system may include a processor, and memory that is communicatively coupled to the processor and includes instructions that are executable by the processor to cause the processor to perform operations. The operations may include receiving, by a transaction manager of a wire transaction processing system, from an initiating channel of a plurality of initiating channels, a request to process a wire transaction. The operations may also include receiving, at a transaction monitoring layer of a monitoring and reporting system, from the transaction manager, an indication that processing of the wire transaction has been initiated by the transaction manager, and monitoring, in real time by the transaction monitoring layer, progress made by the transaction manager in processing the wire transaction. The operations may additionally include determining, by the transaction monitoring layer from monitoring the transaction manager, that processing of the wire transaction has not completed within an expected amount of time, and in response to determining that processing of the wire transaction has not completed within the expected amount of time, determining by the transaction monitoring layer from the transaction manager, a current status of the wire transaction. The operations may further include receiving by a reporting layer of the monitoring and reporting system, from the transaction monitoring layer, the current status of the wire transaction, and reporting, by the reporting layer, the current status of the wire transaction.

According to another example of the present disclosure, a non-transitory computer readable medium may contain instructions that are executable by a processor to cause the processor to perform operations. The operations may include receiving, by a transaction manager of a wire transaction processing system, from an initiating channel of a plurality of initiating channels, a request to process a wire transaction. The operations may also include receiving, at a transaction monitoring layer of a monitoring and reporting system, from the transaction manager, an indication that processing of the wire transaction has been initiated by the transaction manager, and monitoring, in real time by the transaction monitoring layer, progress made by the transaction manager in processing the wire transaction. The operations may additionally include determining, by the transaction monitoring layer from monitoring the transaction manager, that processing of the wire transaction has not completed within an expected amount of time, and in response to determining that processing of the wire transaction has not completed within the expected amount of time, determining by the transaction monitoring layer from the transaction manager, a current status of the wire transaction. The operations may further include receiving by a reporting layer of the monitoring and reporting system, from the transaction monitoring layer, the current status of the wire transaction, and reporting, by the reporting layer, the current status of the wire transaction.

According to a further example of the present disclosure, a computer-implemented method may include receiving, by a transaction manager of a wire transaction processing system, from an initiating channel of a plurality of initiating channels, a request to process a wire transaction. The method may also include receiving, at a transaction monitoring layer of a monitoring and reporting system, from the transaction manager, an indication that processing of the wire transaction has been initiated by the transaction manager, and monitoring, in real time by the transaction monitoring layer, progress made by the transaction manager in processing the wire transaction. The method may additionally include determining, by the transaction monitoring layer from monitoring the transaction manager, that processing of the wire transaction has not completed within an expected amount of time and, in response to determining that processing of the wire transaction has not completed within the expected amount of time, determining by the transaction monitoring layer from the transaction manager, a current status of the wire transaction. The method may further include receiving, by a reporting layer of the monitoring and reporting system, from the transaction monitoring layer, the current status of the wire transaction, and reporting, by the reporting layer, the current status of the wire transaction.

DETAILED DESCRIPTION

A wire transaction computing environment may include a processing system that receives wire transaction processing requests from multiple different initiating channels over a network. Processing of a wire transaction typically occurs quickly. However, as systems for processing wire transactions may be complex overall, and may comprise multiple components and applications that may operate in distributed environments and can reside at different locations, such processing systems can sometimes experience problems when processing wire transactions. For example, and without limitation, a given wire transaction may fail to completely process or process more slowly than expected due to a hardware or software problem, due to corrupt or incomplete data, etc.

Current wire transaction processing systems are not equipped to report a wire transaction processing delay or failure. That is, instead of a wire transaction processing system actively reporting (i.e., pushing a notification or message) the status of a wire transaction experiencing a processing delay or failure to the initiating channel or otherwise, interested parties are instead required to actively investigate (pull) status information from the wire transaction processing system or from the entity associated with the wire transaction processing system. This pulling of information must sometimes occur on a frequent basis over an extended period of time, which is inefficient as well as a waste of user, processor, and memory resources.

Aspects of the present disclosure are directed to a system for automatically monitoring wire transactions during processing by a wire transaction processing system, and actively reporting a real-time status of wire transactions that are not completed within an expected amount of time. Reporting the status of a given wire transaction may be accomplished in a variety of ways, including but not limited to, by communication of wire transaction status directly to the channel that initiated the wire transaction processing request. This saves time, as well as processor and memory resources, and the real-time nature of the reporting may also help to minimize any negative consequences of a wire transaction that is slow or unlikely to complete.

The following illustrative examples are provided to introduce the reader to the general subject matter discussed herein, and are not intended to limit the scope of the disclosed concepts. In the following description, specific details are set forth in order to provide a thorough understanding of various implementations and examples. Various implementations may be practiced without these specific details. The figures and description are not intended to be restrictive.

Figure 1:
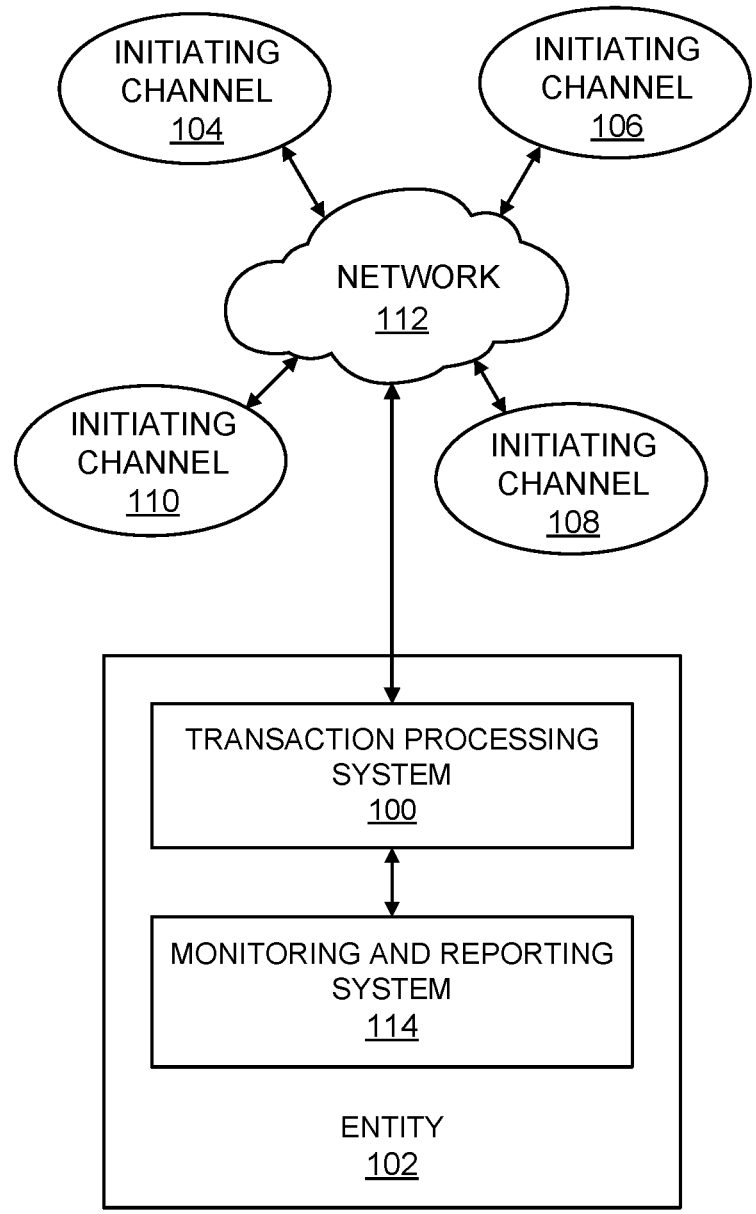
FIG. 1 is a schematic diagram representing one example of a computing environment within which wire transactions can take place, according to an example of the present disclosure.

FIG. 1 is a schematic diagram representing an example of a computing environment including a transaction processing system 100 associated with an entity 102 to which users can transmit wire transaction processing requests. The transaction processing system 100 can receive wire transaction processing requests from a plurality of initiating channels 104, 106, 108, 110. Although four initiating channels 104, 106, 108, 110 are shown in FIG. 1 for purposes of illustration, a different number of initiating channels may be present in other examples. A given transaction processing system can receive wire transaction processing requests from numerous initiating channels.

The initiating channels 104-110 can transmit wire transaction processing requests to the transaction processing system 100 via a network 112. The network 112 may be without limitation, a local area network (LAN), a wide-area network (WAN) such as the Internet, an institutional network, cellular or other wireless networks, virtual networks such as an intranet or an extranet, etc.

A monitoring and reporting system 114 of the entity 102 may be communicatively coupled to the transaction processing system 100. The monitoring and reporting system 114 is operative to monitor in real time the progress made by the transaction processing system 100 when processing a wire transaction. If it is determined that a given wire transaction has not completed within an expected amount of time, the monitoring and reporting system 114 can report the same to the initiating channel, to another interested party, or may otherwise record the same in one or more forms.

Figure 2:
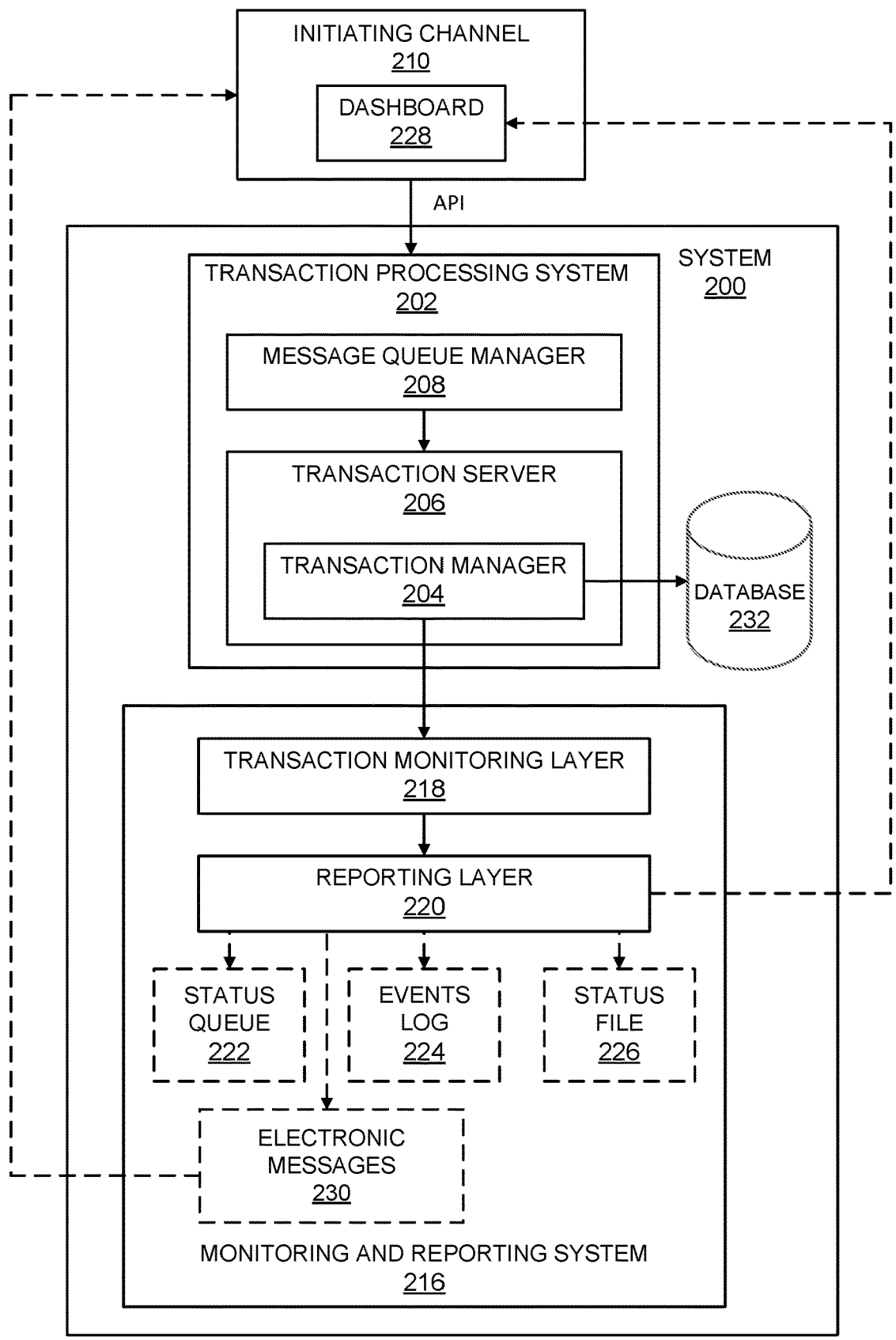
FIG. 2 is a block diagram of a system for monitoring wire transaction progress and reporting wire transaction status in the case of processing delays, according to an example of the present disclosure.

FIG. 2 is a block diagram of a system 200 for monitoring wire transaction processing progress and reporting wire transaction status in the case of processing delays or failures, according to an example of the present disclosure. As shown, the system 200 can include a transaction processing system 202. The transaction processing system 202 can include a transaction manager 204, which may operate on a transaction server 206 to process wire transactions. The transaction manager 204 may be communicatively coupled to a database 232. The database 232 may store information about a party or parties to a wire transaction, account information, or any other information that the transaction manager 204 may need to process a wire transaction. The transaction manager 204 may also store information at the database 232.

The transaction processing system 202 may also include a message queue manager 208 that receives inbound wire transaction processing requests in the form of electronic messages from an initiating channel 210, such as an initiating channel of a plurality of initiating channels as represented in FIG. 1. The message queue manager 208 may place received wire transaction request messages into message queues, from which the queued wire transaction request messages may be transmitted to the transaction manager 204 for processing.

The system 200 may further include a monitoring and reporting system 216. The monitoring and reporting system 216 is communicatively coupled to at least the transaction manager 204 of the transaction processing system 202, such as by a transaction monitoring layer 218. The transaction monitoring layer 218 of the monitoring and reporting system 216 may receive an indication from the transaction manager 204 of the transaction processing system 202 that the transaction manager 204 has initiated processing of a wire transaction. This received indication of processing initiation may function as a trigger that causes the transaction monitoring layer 218 to begin monitoring the progress made by the transaction manager 204 in processing the wire transaction.

By monitoring the transaction manager 204, the transaction monitoring layer 218 can detect cases where (i.e., determine that) processing of a wire transaction has not completed within an expected amount of time. For example, receiving by the transaction monitoring layer 218 an indication that the transaction processing system 202 has initiated processing of a wire transaction may start a timer or trigger another mechanism by which the transaction monitoring layer 218 may determine that processing of a particular wire transaction is tardy or incomplete.

In response to determining that processing of a wire transaction has not completed within an expected amount of time, the transaction monitoring layer 218 may proceed to determine from the transaction manager, a current status of the incomplete wire transaction. For example, the transaction monitoring layer 218 can determine from the transaction manager 204 that a wire transaction is currently stalled at a particular processing stage, or layer, component, application, etc., of the transaction processing system 202.

Once the transaction monitoring layer 218 has determined the current status of a wire transaction that has not completed within an expected amount of time, the current status of the wire transaction may be received by a reporting layer 220 of the monitoring and reporting system 216 from the transaction monitoring layer 218. The reporting layer 220 may then report the current status of the wire transaction. Reporting the current status of the wire transaction may include identifying the processing stage, or layer, component, application, etc., of the transaction processing system 202 at which the wire transaction is currently located.

The transaction monitoring layer 218 may continue to monitor the progress made by the transaction manager 204 in processing the wire transaction, and to periodically determine from the transaction manager a current status of the wire transaction, until processing of the wire transaction is complete or until a predetermined amount of time has elapsed. In the case where monitoring of wire transaction processing is terminated after a predetermined amount of time has elapsed, the reporting layer 220 of the monitoring and reporting system 216 may report the status of the wire transaction as failed. The reporting layer 220, may continue to report an updated current status of the wire transaction until processing of the wire transaction is complete or is deemed to have failed.

The reporting layer 220 of the monitoring and reporting system 216 can report the current status of a wire transaction in various ways. For example, the reporting layer 220 may write the current status of a wire transaction to a status queue 222 or an events log 224 that can be accessed by authorized parties, such as employees or agents of the entity associated with the transaction processing system 202. Alternatively, or in addition thereto, the reporting layer 220 may in some examples write the current status of a wire transaction to a status file 226, and may further transmit the file to at least the initiating channel 210 from which the request to process the wire transaction emanated.

According to some examples, it is also possible that the reporting layer 220 can transmit the current status of a wire transaction to a dashboard 228 associated with the initiating channel 210 from which the request to process the wire transaction emanated. In still other examples, the reporting layer 220 can transmit the current status of a wire transaction by transmitting an electronic message to the initiating channel 210 from which the request to process the wire transaction emanated. Other techniques for reporting the current status of a wire transaction are also possible.

While only a single system 200, and associated transaction processing system 202 and monitoring and reporting system 216 is shown in FIG. 2 for purposes of clarity, it should be realized that examples according to the present disclosure may be distributed systems. For example, multiple instances of distributed wire transaction processing systems may operate on multiple servers at one or more locations, and may receive wire transaction processing requests from a multitude of different initiating channels. Likewise, associated monitoring and reporting systems may be similarly distributed.

Figure 3:
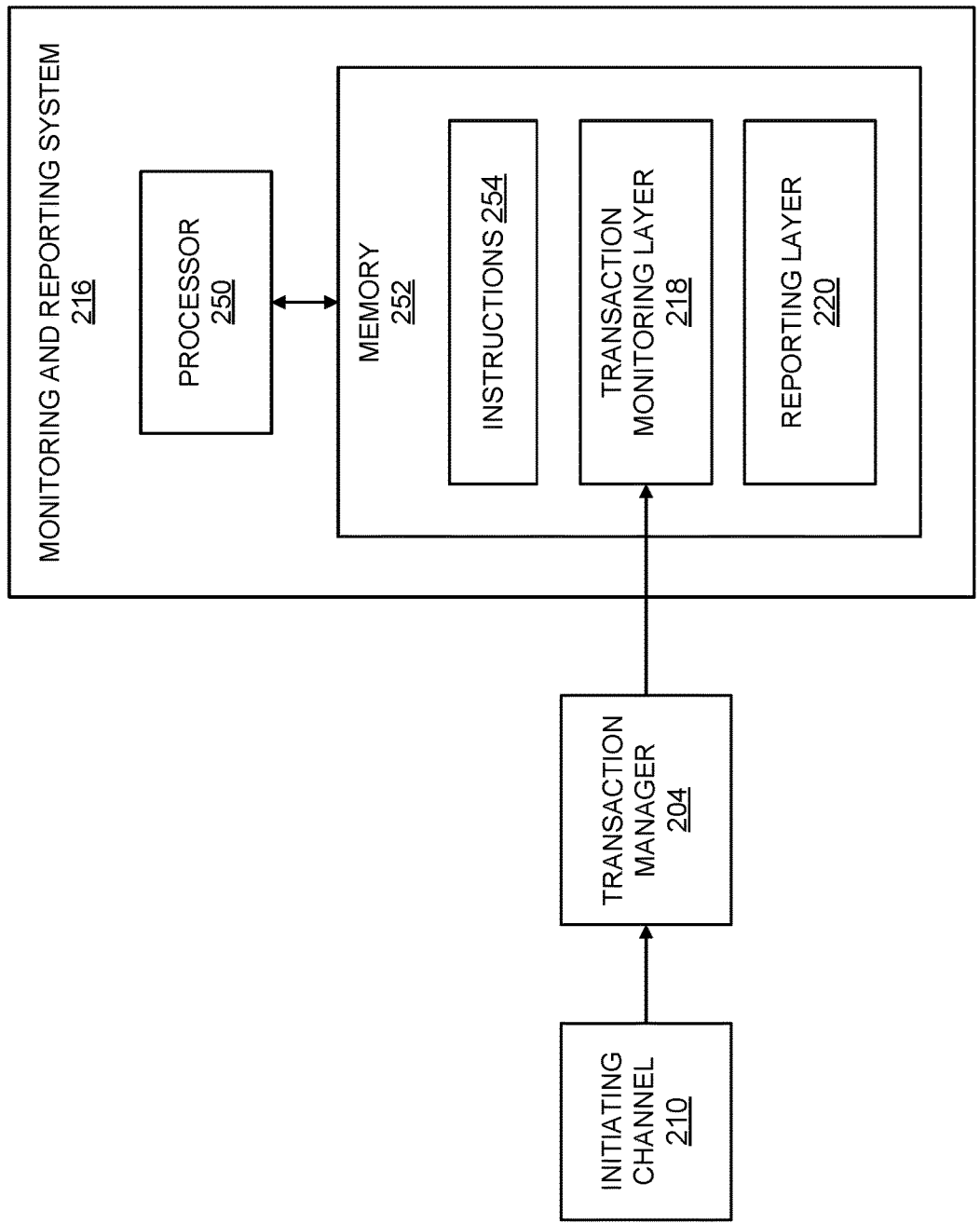
FIG. 3 is more detailed block diagram of a monitoring and reporting portion of a system for monitoring wire transaction progress and reporting wire transaction status in the case of processing delays, according to another example of the present disclosure.

FIG. 3 is more detailed block diagram of the monitoring and reporting system for monitoring wire transaction progress and reporting wire transaction status in the case of processing delays, such as the monitoring and reporting system 216 example described above with respect to the diagram of FIG. 2. As shown, the monitoring and reporting system 216 may include a processor 250 that is communicatively coupled to a memory 252. The processor 250 can include one processing device or multiple processing devices. Non-limiting examples of the processor 250 include a Field-Programmable Gate Array (FPGA), an application-specific integrated circuit (ASIC), a microprocessor, etc. The processor 250 can execute instructions 254 stored in the memory 252 to perform operations. In some examples, the instructions 254 can include processor-specific instructions generated by a compiler or an interpreter from code written in a suitable computer-programming language, such as C, C++, C#, etc.

The memory 252 can include one memory or multiple memories. The memory 252 can be non-volatile and may include any type of memory that retains stored information when powered off. Non-limiting examples of the memory 252 include electrically erasable and programmable read-only memory (EEPROM), flash memory, or any other type of non-volatile memory. At least some of the memory 252 can be a non-transitory computer-readable medium from which the processor 250 can read the instructions 254. A computer-readable medium can include electronic, optical, magnetic, or other storage devices capable of providing the processor 250 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 250 can read the instructions 254.

Figure 4:
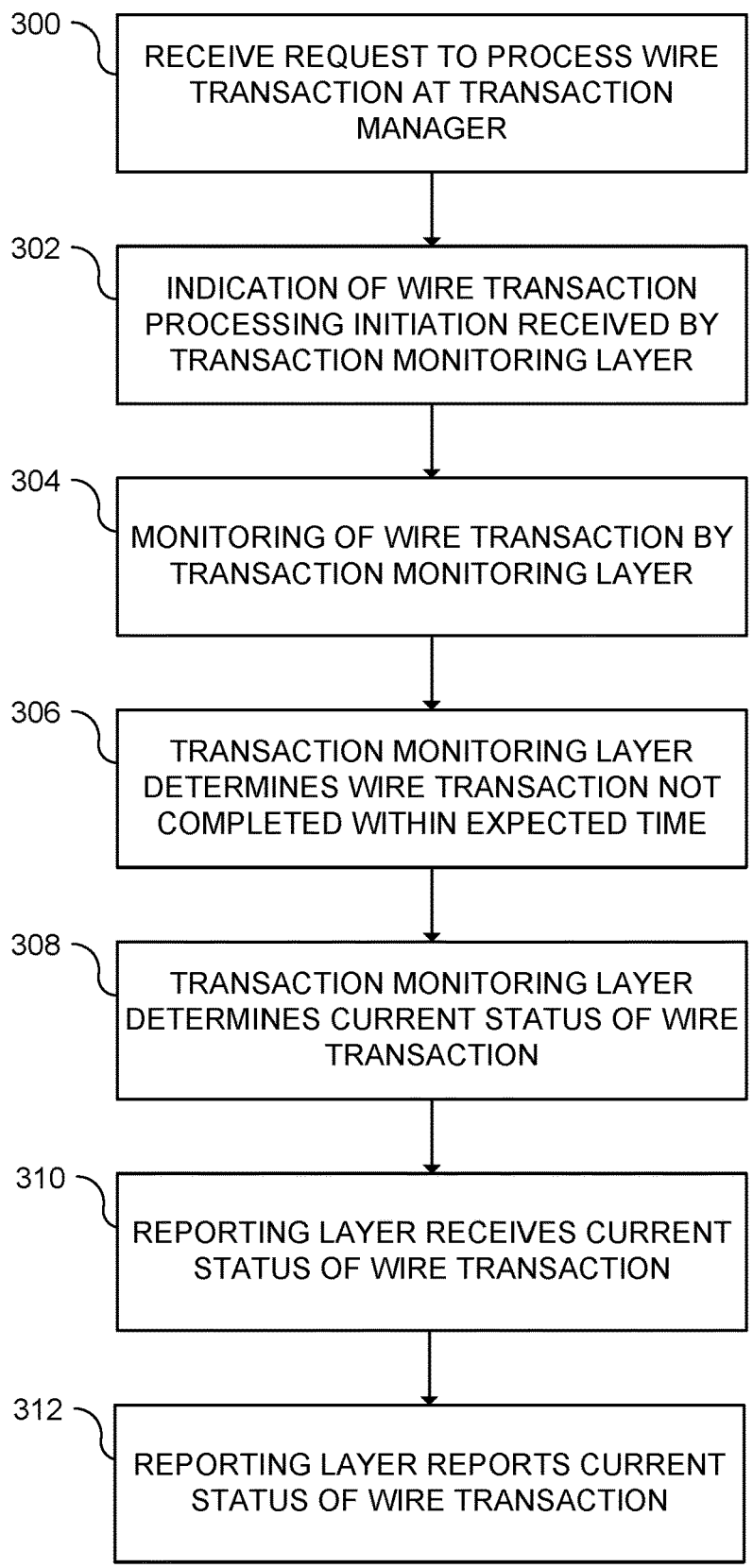
FIG. 4 is a flowchart of a computerized method for monitoring wire transaction progress and reporting wire transaction status in the case of processing delays, according to one example of the present disclosure.

FIG. 4 is a flowchart illustrating one example of a computer-implemented method for monitoring wire transaction progress and reporting wire transaction status in the case of processing delays or failures, according to one example of the present disclosure. As represented, at block 300, a transaction manager of a wire transaction processing system receives, from an initiating channel, a request to process a wire transaction. A block 302, a transaction monitoring layer of a monitoring and reporting system receives from the transaction manager an indication that the transaction manager has initiated processing of the wire transaction. The transaction monitoring layer then begins monitoring, in real time, progress made by the transaction manager in processing the wire transaction, as represented at block 304. At block 306, the transaction monitoring layer subsequently determines from monitoring the transaction manager, that processing of the wire transaction has not completed within an expected amount of time, and in response to determining that processing of the wire transaction has not completed within the expected amount of time, the transaction monitoring layer determines from the transaction manager at block 308, a current status of the wire transaction. A reporting layer of the monitoring and reporting system then receives from the transaction monitoring layer, the current status of the wire transaction, as indicated at block 310, and the reporting layer reports the current status of the wire transaction as indicated at block 312.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system, comprising:
a processor;

memory communicatively coupled to the processor, the memory including instructions that are executable by the processor to cause the processor to:

receive, at a transaction monitoring layer of a monitoring and reporting system, from a transaction manager operating on a transaction server of a distributed wire transaction processing system, an electronic trigger operative to automatically initiate real-time transaction monitoring by the transaction monitoring layer, wherein the electronic trigger is generated in response to receiving, by the transaction manager, from a message queue manager of the distributed wire transaction processing system, a request to process a wire transaction that is received by the message queue manager from an initiating channel of a plurality of initiating channels;

in response to receiving the electronic trigger, activate a timing mechanism to initiate running of a time period within which processing of the wire transaction is expected to be completed;

monitor, in real time by the transaction monitoring layer, progress made by the transaction manager in processing the wire transaction;

periodically determine and report, by the transaction monitoring layer, via communications with the transaction manager, a real-time current location of the wire transaction within the distributed wire transaction processing system;

in response to determining that processing of the wire transaction has not completed at an indicated expiration of the time period by the timing mechanism, determine by the transaction monitoring layer that processing of the wire transaction has failed;

receive, by a reporting layer of the monitoring and reporting system, from the transaction monitoring layer, the location of the wire transaction within the distributed wire transaction processing system at the expiration of the time period; and report, by the reporting layer, that processing of the wire transaction has failed and the location of the wire transaction within the distributed wire transaction processing system at the expiration of the time period.

2. The system of claim 1, wherein the request to process a wire transaction is an electronic message.

3. The system of claim 1, wherein the message queue manager includes a plurality of message queues and resides upstream of the transaction manager.

4. The system of claim 1, wherein the memory includes instructions that are executable by the processor to cause the processor to, while processing of the wire transaction is incomplete;

continue to monitor, by the transaction monitoring layer, the progress made by the transaction manager in processing the wire transaction;

receive, by the reporting layer from the transaction monitoring layer, an updated current location of the wire transaction within the distributed wire transaction processing system; and report, by the reporting layer, the updated current location of the wire transaction.

5. The system of claim 1, wherein the memory includes instructions that are executable by the processor to cause the processor to report, by the reporting layer, the location of the wire transaction within the distributed wire transaction processing system at a given time by writing the location of the wire transaction to a status queue.

6. The system of claim 1, wherein the memory includes instructions that are executable by the processor to cause the processor to:

report, by the reporting layer, the location of the wire transaction within the distributed wire transaction processing system at a given time by writing the location of the wire transaction to a status file; and transmit the status file to at least the initiating channel.

7. The system of claim 1, wherein the memory includes instructions that are executable by the processor to cause the processor to report, by the reporting layer, the location of the wire transaction within the distributed wire transaction processing system at a given time by transmitting the location of the wire transaction to a dashboard associated with the initiating channel.

8. The system of claim 1, wherein the memory includes instructions that are executable by the processor to cause the processor to report, by the reporting layer, the current status of the wire transaction within the distributed wire transaction processing system at a given time by transmitting an electronic message to the initiating channel.

9. A non-transitory computer-readable medium comprising instructions that are executable by a processor for causing the processor to:

receive, at a transaction monitoring layer of a monitoring and reporting system, from a transaction manager operating on a transaction server of a distributed wire transaction processing system, an electronic trigger operative to automatically initiate real-time transaction monitoring by the transaction monitoring layer, wherein the electronic trigger is generated in response to receiving, by the transaction manager, from a message queue manager of the distributed wire transaction processing system, a request to process a wire transaction that is received by the message queue manager from an initiating channel of a plurality of initiating channels;

in response to receiving the electronic trigger, activate a timing mechanism to initiate running of a time period within which processing of the wire transaction is expected to be completed;

monitor, in real time by the transaction monitoring layer, progress made by the transaction manager in processing the wire transaction;

periodically determine and report, by the transaction monitoring layer, via communications with the transaction manager, a real-time current location of the wire transaction within the distributed wire transaction processing system;

in response to determining that processing of the wire transaction has not completed at an indicated expiration of the time period by the timing mechanism, determine by the transaction monitoring layer that processing of the wire transaction has failed;

receive, by a reporting layer of the monitoring and reporting system, from the transaction monitoring layer, the location of the wire transaction within the distributed wire transaction processing system at the expiration of the time period; and report, by the reporting layer, that processing of the wire transaction has failed and the location of the wire transaction within the distributed wire transaction processing system at the expiration of the time period.

10. The non-transitory computer-readable medium of claim 9, wherein the request to process a wire transaction is an electronic message.

11. The non-transitory computer-readable medium of claim 9, wherein the instructions of the non-transitory computer-readable medium are executable by the processor for further causing the processor to, while processing of the wire transaction is incomplete:
continue to monitor, by the transaction monitoring layer, the progress made by the transaction manager in processing the wire transaction;
receive, by the reporting layer from the transaction monitoring layer, an updated current location of the wire transaction within the distributed wire transaction processing system; and
report, by the reporting layer, the updated current location of the wire transaction.

12. The non-transitory computer-readable medium of claim 9, wherein the instructions of the non-transitory computer-readable medium are executable by the processor for causing the processor to report, by the reporting layer, the location of the wire transaction within the distributed wire transaction processing system at a given time by writing the location of the wire transaction to a status queue.

13. The non-transitory computer-readable medium of claim 9, wherein the instructions of the non-transitory computer-readable medium are executable by the processor for causing the processor to:
report, by the reporting layer, the location of the wire transaction within the distributed wire transaction processing system at a given time by writing the location of the wire transaction to a status file; and
transmit the status file to at least the initiating channel.

14. The non-transitory computer-readable medium of claim 9, wherein the instructions of the non-transitory computer-readable medium are executable by the processor for further causing the processor to report, by the reporting layer, the location of the wire transaction within the distributed wire transaction processing system at a given time by transmitting the location of the wire transaction to a dashboard associated with the initiating channel.

15. The non-transitory computer-readable medium of claim 9, wherein the instructions of the non-transitory computer-readable medium are executable by the processor for further causing the processor to report, by the reporting layer, the current status of the wire transaction within the distributed wire transaction processing system at a given time by transmitting an electronic message to the initiating channel.

16. A computer-implemented method comprising:
receiving, at a transaction monitoring layer of a monitoring and reporting system, from a transaction manager operating on a transaction server of a distributed wire transaction processing system, an electronic trigger that automatically initiates real-time transaction monitoring by the transaction monitoring layer, wherein the electronic trigger is generated in response to receiving, by the transaction manager, from a message queue manager of the distributed wire transaction processing system, a request to process a wire transaction that is received by the message queue manager from an initiating channel of a plurality of initiating channels;
in response to receiving the electronic trigger, activating a timing mechanism that initiates running of a time period within which processing of the wire transaction is expected to be completed;
monitoring, in real time by the transaction monitoring layer, progress made by the transaction manager in processing the wire transaction;
periodically determining and reporting, by the transaction monitoring layer, via communications with the transaction manager, a real-time current location of the wire transaction within the distributed wire transaction processing system;
in response to determining that processing of the wire transaction has not completed at an indicated expiration of the time period by the timing mechanism, determining by the transaction monitoring layer that processing of the wire transaction has failed;
receiving, by a reporting layer of the monitoring and reporting system, from the transaction monitoring layer, the location of the wire transaction within the distributed wire transaction processing system at the expiration of the time period; and
reporting, by the reporting layer, that processing of the wire transaction has failed and the location of the wire transaction within the distributed wire transaction processing system at the expiration of the time period.

17. The computer-implemented method of claim 16, wherein the request to process a wire transaction is an electronic message.

18. The computer-implemented method of claim 16, further comprising, while processing of the wire transaction is incomplete:
continuing to monitor, by the transaction monitoring layer, the progress made by the transaction manager in processing the wire transaction;
receiving, by the reporting layer from the transaction monitoring layer, an updated current location of the wire transaction within the distributed wire transaction processing system; and
reporting, by the reporting layer, the updated current location of the wire transaction.

19. The computer-implemented method of claim 16, wherein the reporting layer reports the current location of the wire transaction within the distributed wire transaction processing system at a given time by an action selected from the group consisting of writing the location of the wire transaction to a status queue, writing the location of the wire transaction to a status file and transmitting the status file to at least the initiating channel, and a combination thereof.

20. The computer-implemented method of claim 16, wherein the reporting layer reports the location of the wire transaction within the distributed wire transaction processing system at a given time by an action selected from the group consisting of transmitting the location of the wire transaction to a dashboard associated with the initiating channel, transmitting an electronic message to the initiating channel, and a combination thereof.

* * * * *